Patented Dec. 17, 1940

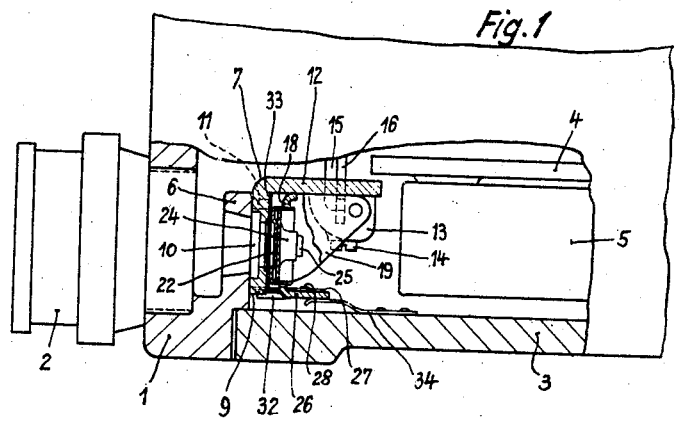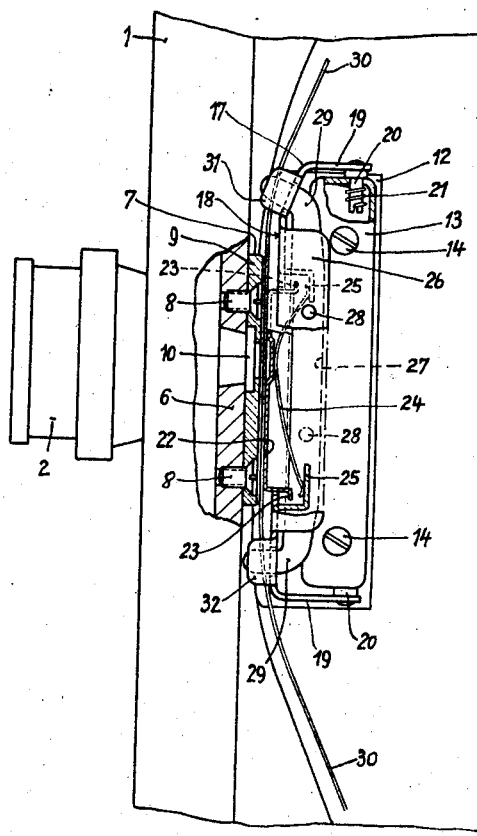

2,225,021

UNITED STATES PATENT OFFICE 2,225,021

FILM GUIDE STRUCTURE FOR MOTION PICTURE CAMERAS

Willy Schwenk, Ludwigsburg, Germany, assignor to Robert Bosch Gesellschaft mit beschränkter Haftung, Stuttgart, Germany Application January 27, 1939, Serial No. 253,185
In Germany February 26, 1938

10 Claims. (Cl. 88—17)

The present invention relates to motion picture cameras.

In cameras for taking motion pictures it is known to provide film guides in which plate springs provided on the casing cover or door are pressed against the edges of the film and a resilient pressure member influenced by the film holder is pressed against the surface of the film. This type of construction has the drawback that after the holder has been inserted the surface of the film is already pressed into position before the springs provided on the casing cover can press against the edge of the film.

It has been proposed also to provide a rockable carrier for a resiliently loaded film pressure plate, which carrier is disposed in the camera casing and must be brought manually into the operative position, and to hold it in the operative position by means of a spring provided on the casing cover and to press said carrier against the edge of the film by a resilient member likewise secured to the casing cover. The disposal of the edge and surface guide parts on various constructional parts of the camera involves observance of particularly high requirements of tolerance and precision in manufacture, whilst this type of construction also involves a good deal of space and furthermore requires the use of a plurality of different handles for efficient operation.

According to the present invention, the resilient plate for pressing against the film and the resilient means acting on the edge of the film are disposed on a common frame which can be rocked relatively to the fixed film guide parts into the operative position against a resilient load.

By this means it is obtained that both resilient guide means for the film, i. e. the edge guide and the surface guide, can be brought into the working position in the correct sequence with only one movement, and at the same time enabling the movement to be controlled by a simple operation such as the act of closing the casing cover or door.

The rockable frame carrying the resilient film guide parts is appropriately linked to the constructional part which forms the fixed guide parts. Use is made of the space enclosed by the rockable frame and by the parts carried thereby for accommodating parts of the film driving mechanism by providing a protecting casing secured to the constructional part forming the fixed film guide parts. By this means there is obtained a particularly space-saving mode of construction.

The present invention is more particularly described with reference to the accompanying drawing, in which:

Figure 1 is a horizontal partial section through a camera casing and film guide parts disposed therein.

Figure 2 is a corresponding side elevation likewise partly in section.

The camera casing 1, into the end wall of which the lens housing 2 is inserted, has a displaceable cover or door 3. Between this cover and a plate 4 is accommodated a holder 5 which contains the film spools. A fixed guide part 7 for the film is secured by means of screws 8 to a part 6 of the camera casing, which part is slotted to permit the passage of image rays therethrough. The fixed part 7 constitutes substantially an angle, one limb 9 of which has an image window or slot 10, a gap 11 for the passage of the claw feeding mechanism across the slot, and the securing holes for the screws 8. The other limb 12 of the angle 7, which extends both upwardly and downwardly beyond the limb 9 serves for fitting a protecting casing 13, which is used at the same time as a pivot for a rockable frame 17 and is firmly connected with limb 12 by screws 14. The limb 9 has gaps through which parts 15, 16 of the film driving mechanism pass into the interior of the casing 13. The frame 17 consists substantially of a front plate 18, the upper and lower ends of which are flanged to form lugs 19 of triangular shape in plan view. Bolts 20 are riveted to the lugs 19, and are guided so as to be easily movable in close fitting holes formed in the casing 13. Torsion springs 21 are provided, each of which at one end engages in a slot at the inner end of a bolt 20 and at the other end abuts against the casing 13, the said springs tending to rock the bolts together with the frame 17 (Figure 1) in a counterclockwise direction and thus to open the film guide.

In the front plate 18 of the frame 17 is a recess into which is inserted a film pressure plate 22, which has bent back flanged portions 23 located in rear of the recess and under the action of a spring 24 is adapted to be pushed forwards relatively to the recess, the limiting position of forward displacement being determined by stops on the bent back portions 23. The plate spring 24 is inserted behind the plate 22 within the frame 17 and abuts on lugs 25 bent inwardly of the frame. To the inner surface of a further inwardly bent over part 26 of the frame 17 is fitted a plate spring 27 which is mounted in position by means of the rivets 28. The plate spring 27 is bent over at its ends to form lugs 29 which press against the edge of the film 30 in order to guide the latter. With the object of preventing the lugs 29 of the spring 27 from being bent over to an inadmissible degree by inexpert operation with the camera opened, rigid stops 31 and 32 are provided on the frame 17 by bending over portions of said frame, the resilient lugs 29 bearing against said stops after a predetermined degree of bending over has been attained.

The limb 9 of the fixed guide 7 for the film surface is constructed in the manner known for these components, namely in such a way that the film is pressed at the sides only of the actual image strip adjacent the edges of the film, and accordingly the limb 9 is therefore slightly recessed over the width of the actual image.

The fixed edge guide for the film is formed by the limb 12 of the fixed guide 7 whilst at the point where the limbs 9 and 12 meet, the inner surface of the angle member is recessed at 33. The resilient guide for the film surface is formed by the pressure plate 22 which is likewise slightly recessed in known manner in rear of the image window and presses the film at those parts bounding the image window so that the completely flat position of the film in the image window is ensured. The guidance of the outer edge of the film is effected by the resilient lugs 29.

The frame 17 with all bent over parts thereof is maintained in the operative position against the action of the springs 21 by a plate spring 34 which is riveted on the inner side of the camera cover and cooperates with the bent over surface 26 of the frame 17.

It will be seen that when the camera cover or door 3 is opened, the spring 34 is rendered inoperative whereupon the springs 21 rock the frame 17 in a counterclockwise direction (Fig. 1). Thus when the cover is opened the film is automatically released from guiding pressure on its edge and its surface, whilst again it can be inserted without hindrance in the inoperative position of the guide parts. Hereafter no further operation has to be performed other than to close the camera cover, for both the film edge guide elements and the surface guide elements then move automatically into the operative position. By suitable selection of the strength of the springs and the bending over of the lugs 29, it is easy to ensure that by pressure on its edge the film is first straightened in a direction transversely to its direction of movement during running and only then is pressure applied to its surface.

I declare that what I claim is:

1. A film guide for a motion picture camera comprising a casing provided with an opening and a door for closing said opening, fixed guide means in said casing for the film, a frame member, means for pivoting said frame member with respect to said fixed guide means, spring means tending to rock said frame member on its pivots away from said fixed guide means, a pressure plate movably mounted on said frame member, resilient loading means for said pressure plate urging said plate against the surface of the film and said film in contact with the fixed guide means in opposition to said spring means, movable film edge guiding means carried by said frame member and resiliently loaded in opposition to said spring means to engage an edge of said film and guide the film edges between the fixed and movable guiding means, and means carried by said door and operative to position said frame member and the movable film guiding means carried thereby in operative position relative to the fixed guide means against the tension of said spring means upon closure of said door.

2. In a motion picture camera, the combination with a casing provided with an opening and a door for closing said opening, of film guiding means within said casing and comprising opposed fixed and movable film face guiding members and opposed fixed and movable film edge guiding members, a pivoted frame member carrying said movable face guiding member and said movable edge guiding member for movement into and out of film guiding position, means resiliently mounting each of said movable guiding members on said pivoted frame member for movement relative thereto, spring means tensioned in opposition to said resilient mounting means for yieldably urging said pivoted frame member and said movable guiding members away from said fixed guiding members, and means carried by said door and operative to position said pivoted frame member and the movable guiding members carried thereby in film guiding position against the tension of said spring means upon closure of said door.

3. In a motion picture camera, the combination with a casing provided with an opening and a door for closing said opening, of film guiding means within said casing and comprising opposed fixed and movable film face guiding members and opposed fixed and movable film edge guiding members, a pivoted frame member carrying said movable face guiding member and said movable edge guiding member for movement into and out of film guiding position, means resiliently mounting each of said movable guiding members on said pivoted frame member for movement relative thereto, spring means tensioned in opposition to said resilient mounting means for yieldably urging said pivoted frame member and said movable guiding members away from said fixed guiding members, and means carried by said door and operative to position said pivoted frame member and the movable guiding members carried thereby in film guiding position against the tension of said spring means upon closure of said door, said pivoted frame member being pivoted on an axis spaced sufficiently to the rear of said film and at one edge thereof and having an arm adapted to extend substantially parallel to the rear face of said film and to the other edge of said film and said movable edge guiding member being mounted on the end of said arm at the other edge of said film whereby as said pivoted frame member and movable edge guiding member are moved to film guiding position said movable edge guiding member has a component of motion substantially in the plane of said film.

4. A film guide for a motion picture camera comprising a casing, fixed guide parts in said casing for the film, a frame member, means for pivoting said frame member with respect to said fixed guide parts, spring means tending to rock said frame member in one direction about its pivots, a pressure plate on said frame member and resiliently loaded in opposition to said spring means for engaging with the surface of said film, guide means also on said frame member and resiliently loaded in opposition to said spring means for engaging with the edges of said film, and a protecting casing for parts of the film driving mechanism, which casing is rigidly secured to said fixed guide parts and is accommodated within a space enclosed by the pivotal frame member and the resiliently loaded parts carried thereby.

5. A film guide as claimed in claim 4 and wherein the protecting casing constitutes the pivotal means for the pivotal frame member.

6. A film guide as claimed in claim 4 and wherein the film pressure plate, which is loaded by a spring supported on bent over parts of the pivotal frame member is inserted in a recess in the front wall of said pivotal frame member.

7. A film guide as claimed in claim 4 and wherein a plate spring, the bent over edges of which extend beyond the pivotal frame member and press against the edge of the film to form the resiliently loaded edge guides thereof, is rigidly secured to a bent over part of said pivotal frame member.

8. A film guide as claimed in claim 4 and wherein the pivotal frame member is bent over to form lugs which constitute steps preventing excessive deflection of bent over ends of a plate spring forming the resiliently loaded edge guides of the film, the ends of said plate spring after a predetermined maximum bending thereof bearing against said lugs.

9. A film guide as claimed in claim 4 and wherein pivot pins of the pivotal frame member are rigidly secured to said frame and are guided so as to be loosely rotatable in said protecting casing whilst torsion springs are provided which act on the pins to constitute a resilient load against which the frame member is rotatable.

10. A film guide as claimed in claim 4 and wherein the pivotal frame member and the parts associated therewith are maintained in their operative position against the action of at least one spring constituting the resilient load on said frame member by means of a spring carried by a cover or door of the camera casing.

WILLY SCHWENK.